A. WEITMAN.
Broadcast Seeder
No. 71,096.
Patented Nov. 19, 1867.
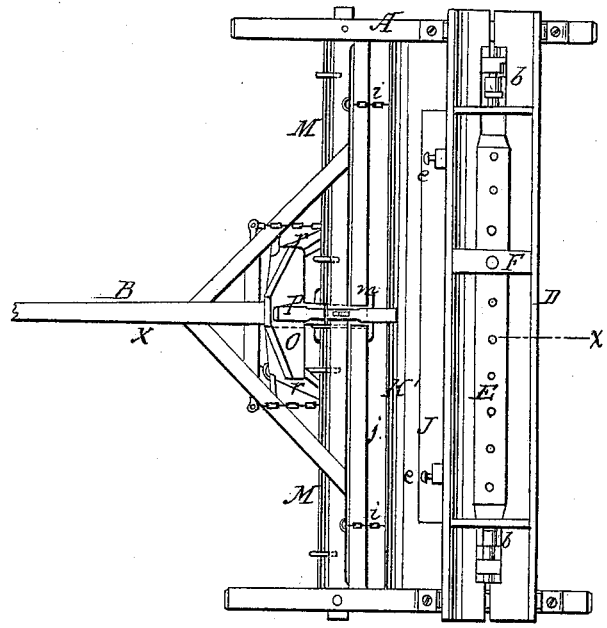
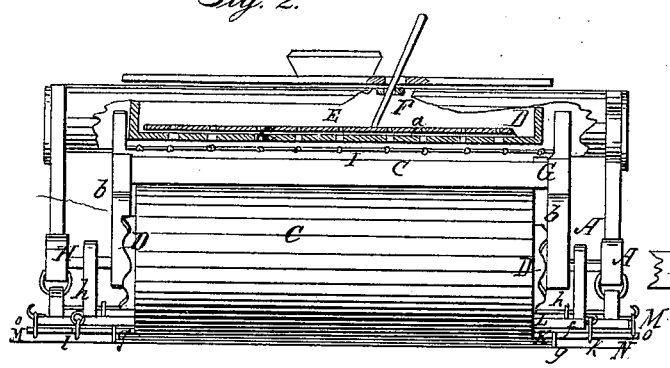
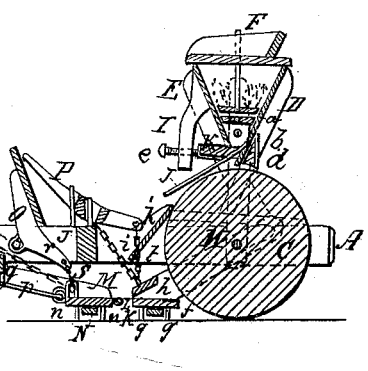
Witnesses:
Theo Tusche
Wm Turm
Inventor:
Aug Weitman
Per Munn & Co
Attorneys

United States Patent Office.

AUGUSTUS WEITMAN, OF WEST UNION, IOWA.

Letters Patent No. 71,096, dated November 19, 1867.

---

IMPROVEMENT IN BROADCAST SEEDING MACHINE.

---

The Schedule referred to in these Letters Patent and making part of the same.

---

TO ALL WHOM IT MAY CONCERN:

Be it known that I, AUGUSTUS WEITMAN, of West Union, in the county of Fayette, and State of Iowa, have invented a new and improved Broadcast Seeding Machine; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

This invention relates to a new and improved broadcast seeding machine, and it consists in means employed to prevent the choking of the harrows, and also in means to insure a proper distribution of the seed, and the sowing of the same in a perfect manner. In the accompanying sheet of drawings—

Figure 1 is a plan or top view of my invention.

Figure 2, a rear view of the same, with the seed-box in section.

Figure 3, a transverse section of the same, taken in the line $x\ x$, fig. 1.

Similar letters of reference indicate like parts.

A represents a rectangular frame, to which a draught-pole, B, is attached, and C is a roller, fitted in the rear part of said frame, directly underneath a seed-box, D, the latter extending nearly the whole width of the frame A. The bottom of the seed-box D is perforated with holes $a$, at suitable distances apart, and directly over this perforated bottom there is placed a perforated slide, E, which is operated manually, through the medium of a lever, F. (See fig. 2.) G is a frame, composed of two uprights $b\ b$, connected by a horizontal bar, $c$, near their upper ends. The lower ends of the uprights $b\ b$ are fitted loosely on the axle or shaft H of the roller C, and on each end of the roller C there is secured a toothed rim, D, by which a positive reciprocating movement is given the frame G, as the machine is drawn forward and the roller C rotates. To the upper parts of the uprights $b\ b$, above the bar $c$, there is attached a knotted rope, I, which is directly underneath the perforated bottom of the hopper. This knotted rope regulates the flow of the seed from the box D, and insures its proper discharge through the passage $d$, between a discharge-board or plate, J, and an adjustable bar, K, which is at the lower part of the front side of the hopper, and is made adjustable by set-screws $e\ e$, for the purpose of increasing or diminishing the capacity of the passage $d$, according to the amount of seed to be sown over a given area. The discharge-board J, in connection with another one, K′, causes the seed to be discharged in front and clear of the roller C, as will be fully understood by referring to fig. 3.

L represents a harrow, which is composed of a bar, $f$, having two longitudinal rows, $g$, of teeth inserted in it. The bar $f$ is attached to the front ends of two arms $h\ h$, the rear ends of which are fitted loosely on the shaft or axle H of the roller C, and the harrow is sustained at the proper height by chains $i$ from the cross-bar $j$ in frame A. Between the two rows of teeth $g\ g$ of this harrow there is fitted a bar, $k$, of wood or iron, and secured at each end by a hook and link, $l$, or other suitable fastening, so as to be in contact with the under surface of the bar $f$. In case the harrow should become choked or foul, it may be readily cleaned by unhooking the ends of the bar $k$ and pressing it downward.

M M are two supplementary harrows, placed in front of the harrow L, and connected at their inner ends by a joint, $m$. These harrows, like the harrow L, are provided with two rows of teeth $n\ n$, having cleaning-bars N placed between them, and secured at their ends by hooks and links $o$, or other fastening. The outer ends of the harrows M have bars $p$ attached, the upper ends of which are connected, by links $q$, with the sides of the frame A.

The beams M M may be raised, when desired, by means of a treadle, O, fitted on the rear end of the draught-pole B, and having two arms $r$ extending behind it, to which said harrows are connected by chains $s$. The harrow L may also be raised, when desired, by means of a treadle, P, directly behind the treadle O, and having the harrow L connected to it by a chain, $t$. The treadle P extends or projects over the rear of O, so that, by depressing the front end of P, all the harrows will be raised simultaneously, and M M raised alone by depressing O.

Having thus described my invention, I claim as new, and desire to secure by Letters Patent—

1. Providing the harrows L, M M, any or all of them, with cleaning-bars k N, arranged or applied in the manner substantially as and for the purpose set forth.

2. The combination of the seed-box D with its perforated bottom and slide E, adjustable bar K, discharge-board J, and roller C, all arranged substantially in the manner as and for the purpose set forth.

3. The reciprocating knotted rope I, or its equivalent, operated by the frame G from the roller C, in combination with the adjustable bar K and the discharge-board or plate J, all arranged substantially as and for the purpose specified.

4. The harrows L, M M, combined, constructed, and applied to the machine substantially in the manner as and for the purpose set forth.

AUGUSTUS WEITMAN.

Witnesses:
JOAB CLOYER,
M. B. SPERR.